United States Patent
Weber et al.

[11] Patent Number: 5,163,789
[45] Date of Patent: Nov. 17, 1992

[54] DEVICE FOR PRODUCING DRILLED HOLES WITH AN UNDERCUT

[75] Inventors: Wilfried Weber, Schopfloch-Unteriflingen; Stefan Lind, Birkenhördt; Herbert Erath, Waldachtal/Salzstetten, all of Fed. Rep. of Germany

[73] Assignee: fischerwerke Artur Fischer GmbH & Co. KG, Waldachtal 3/Tumlingen, Fed. Rep. of Germany

[21] Appl. No.: 667,590

[22] Filed: Mar. 11, 1991

[30] Foreign Application Priority Data

Mar. 9, 1990 [DE] Fed. Rep. of Germany ....... 4007545
Mar. 27, 1990 [DE] Fed. Rep. of Germany ....... 4009735

[51] Int. Cl.⁵ .................................. B23B 39/02
[52] U.S. Cl. ........................... 408/27; 409/200; 409/203; 409/219; 51/90; 51/60; 74/86; 74/600
[58] Field of Search ........... 409/199, 143, 200, 162, 409/219, 226, 197, 203; 74/86, 600, 837; 51/33 A, 90, 43, 60, 44, 91 R, 58, 60, 170 MT; 274/6; 408/150, 187, 108, 180, 22, 26, 27; 108/20-22; 82/1, 4

[56] References Cited

U.S. PATENT DOCUMENTS

| | | | |
|---|---|---|---|
| 369,233 | 8/1887 | Coxe et al. | 74/86 |
| 793,391 | 6/1905 | Olsson | 409/162 |
| 1,211,381 | 1/1917 | Alden | 409/219 X |
| 1,848,108 | 3/1932 | Copland | 51/90 |
| 2,715,806 | 8/1955 | Hancock, Jr. | 51/90 |
| 2,893,177 | 7/1959 | Bruck | 51/170 |
| 3,312,170 | 4/1967 | Brailsford | 74/600 |
| 3,332,321 | 7/1967 | Jacobsen | 409/228 X |
| 3,435,562 | 4/1969 | Maillet | 51/60 |
| 3,495,636 | 2/1970 | Smith | 409/143 X |
| 3,663,785 | 5/1972 | Hausermann | 219/69.17 |
| 4,033,229 | 7/1977 | Sarnelli, Jr. | 409/143 |
| 4,061,315 | 12/1977 | Eitzen | 74/86 X |
| 4,091,713 | 5/1978 | Kennedy | 74/86 X |
| 4,154,555 | 5/1979 | Skrentner | 408/26 X |
| 4,487,275 | 12/1984 | Froehlich | 408/150 X |
| 4,821,357 | 4/1989 | Millette | 51/170 MT |
| 4,891,916 | 1/1990 | Rhoades et al. | 51/60 |

FOREIGN PATENT DOCUMENTS

76756 5/1984 Japan ...................................... 74/86

Primary Examiner—Larry I. Schwartz
Assistant Examiner—Robert Schultz
Attorney, Agent, or Firm—Michael J. Striker

[57] ABSTRACT

A device for producing drilled holes with an undercut in facing panels includes a drill bit with a drill head that produces an undercut, and a drilling table for supporting a facing panel in which the drilled holes with an undercut are to be produced and displaceable in a plane of the drilling table. A trunnion projecting from a rotatable base member and engaging a bearing secured to the drilling table is movable between a first position in which the trunnion axis coincides with the axis of rotation of the base member, and a second position in which the trunnion axis is eccentric to the axis of rotation of the base member to effect swiveling of the drilling plate when the rotatable base is driven rotatably.

The device has a mechanism for moving the trunnion between the first and second positions including a lever pivotally mounted on the base member, the trunnion being mounted on the lever, and a piston-cylinder drive secured to the base member for pivoting the lever.

7 Claims, 3 Drawing Sheets

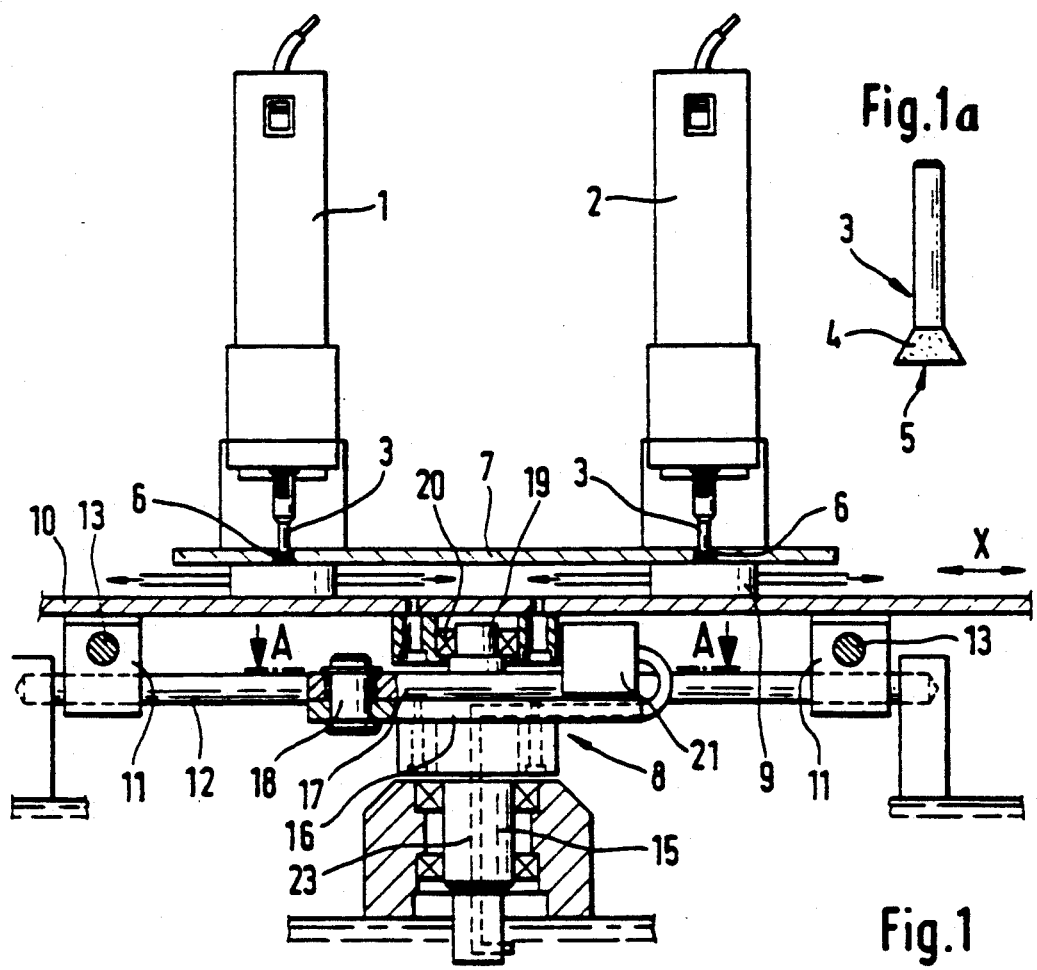
Fig.1a
Fig.1
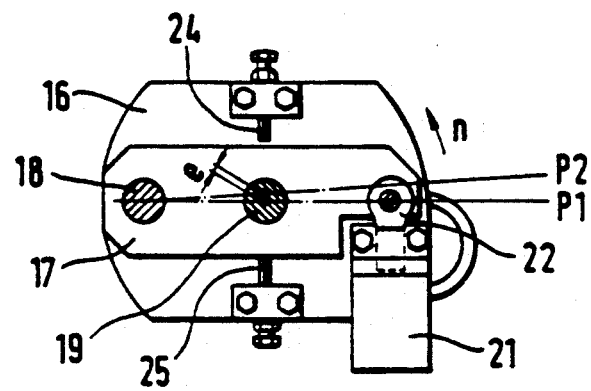
Fig.2
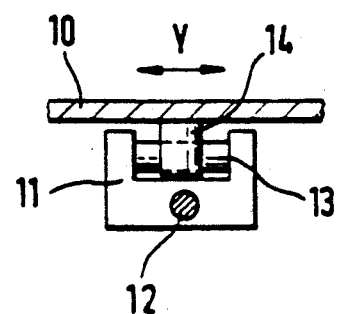
Fig.3

DEVICE FOR PRODUCING DRILLED HOLES WITH AN UNDERCUT

BACKGROUND OF THE INVENTION

The invention relates to a device for producing drilled holes with an undercut in facing panels. A drilling machine for making a drilled hole with an undercut is known including at least one drill bit at the shank end of which there is provided a drill head for producing the undercut, and a table on which a facing panel is secured.

The prior art discloses devices for producing drilled holes with an undercut and which have a bearing bush with a concave depression in which a drill bit provided with a collar is supported and pivotally mounted. By pivoting-out the drill bit while simultaneously moving it with a circular motion, the lateral cutting edges formed on the drill bit ream out an undercut in the region of the bottom of the drilled hole, into which an expansible fixing plug with an expansible sleeve can be inserted with a matching fit.

Such drilled holes with an undercut can also be made in facing panels or similar structures, but in that case the undercuts have to be made very precisely, so that when inserting and expanding an expansible anchor, the generated expansion pressure is not too great. Too great an expansion pressure can result in a part of the facing panel breaking away. To produce a precise undercut, drill bits which have a drill head tipped with diamond chips are used. The truncated cone-shaped drill head can be provided on its outer peripheral surface and on its end face with diamond chips so that both the bore and the undercut can be made with a single drill bit. When using such a drill bit, several bores with undercuts can be made on the rear side of a facing panel. To ream out the undercuts, the drilling devices conventionally have to be swivelled by hand. Since a high accuracy is required for an undercut of this type, this operation requires good concentration and is comparatively time-consuming.

SUMMARY OF THE INVENTION

The object of the invention is a device for making drilled holes with an undercut in panels, especially facing panels, with which the undercuts can be made by machine with the greatest possible accuracy.

The object of the invention is achieved by providing a drilling table displaceable in the X- and Y-directions, and a base member with a trunnion movable between concentric and eccentric positions and extending into a bearing in the drilling table. Thereby, a facing panel secured to the drilling table can be swivelled in the X-Y-plane. In order to make several bores with undercuts simultaneously on the rear of a facing panel a corresponding number of drills with suitable drill bits is provided. The drills are only height-adjustable, while the drilling table is swivelled by displaceable rotating trunnion. During the reaming-out operation, the drills are stationary, while the facing panel is moved by the adjustable trunnion from a starting position and is displaced along a circular path. The radius of the circular path determines the depth of the undercut. After the reaming-out operation, the trunnion is brought into its initial position again, so that the drill bits can be pulled out of the drilled holes again. In this manner, all undercuts to be made on the rear of a facing panel, can be made rapidly and with a high degree of accuracy. The essential factor is that between the drills and the drill bits fixed to them, on one hand, and the facing panel, on the other hand, a circular movement is performed by machine, which causes all the undercuts to be reamed out simultaneously.

It is especially advantageous to arrange the trunnion on a pivotal lever which in turn is pivotally mounted on a base member. In the starting or initial position, the trunnion is aligned concentrically with the axis of rotation of the base member. If the pivotal lever is then moved slightly, then the trunnion is brought into an eccentric position. Since the base member, together with the pivotal lever mounted thereon, rotates, the central axis of the trunnion now moves along a circular path so that the drilling table, which is engaged by the trunnion, likewise executes a circular movement. In this manner, a facing panel secured to the drilling table is displaced along a circular path and all the undercuts are reamed out simultaneously.

The pivotal lever, on which the trunnion is arranged, can be pivoted by a pneumatic linear drive. End stops can be provided on the base plate to define a starting position and an end position for the pivotal lever and hence for the trunnion.

A facing panel can be secured to the drilling table in an especially simple manner by suction arrangements effective between the facing panel and the drilling table. Alternative securing methods are possible here, however; for example, a facing panel can be secured also by mechanical clamping means.

The drilling table is preferably mounted on transverse and longitudinal guides, which guarantee an exact swivel movement in the XY-plane.

The drilling table may also be mounted without guide rods directly on resiliently deformable elements, which are formed as leaf springs displaced by 90° with respect to one another. Each leaf spring is flexible in one direction, so that by the 90° displacement of two leaf springs arranged one above the other, the drilling table is guaranteed mobility in XY-plane.

Furthermore, springs and/or anti-vibration elements engaging the drilling table laterally may be provided to hold the drilling table in the unloaded state in a starting position and accommodate the swivel movement. The anti-vibration elements thus counteract undesirable vibrations during the reaming-out operation.

The reaming-out operation can also be performed by pivotally mounted drills. For this operation, the facing panel to be machined is secured rigidly on the drilling table so that as the undercuts are made the facing panel is unable to move. Similar elements to those used in the embodiment with a drilling table mounted to be displaceable in all directions can be used as the drive arrangement and as bearings for the horizontally displaceable drills.

The present invention both as to its construction so to its method of operation, together with additional objects and advantages thereof, will be best understood from the following detailed description of the preferred embodiments when read with reference to the drawings.

BRIEF DESCRIPTION OF THE DRAWINGS

FIG. 1 shows an elevational cross-sectional view of a device according to the invention for producing drilled holes with an undercut in facing panels;

FIG. 1a shows an elevational view of a drill bit of the device shown in FIG. 1;

FIG. 2 shows a cross-sectional view along the section line A—A in the region of the adjustable trunnion of the device shown in FIG. 1;

FIG. 3 shows a side view of a bearing element for the drilling table of the device shown in FIG. 1;

DETAILED DESCRIPTION OF THE PREFERRED EMBODIMENTS

Figure 4:
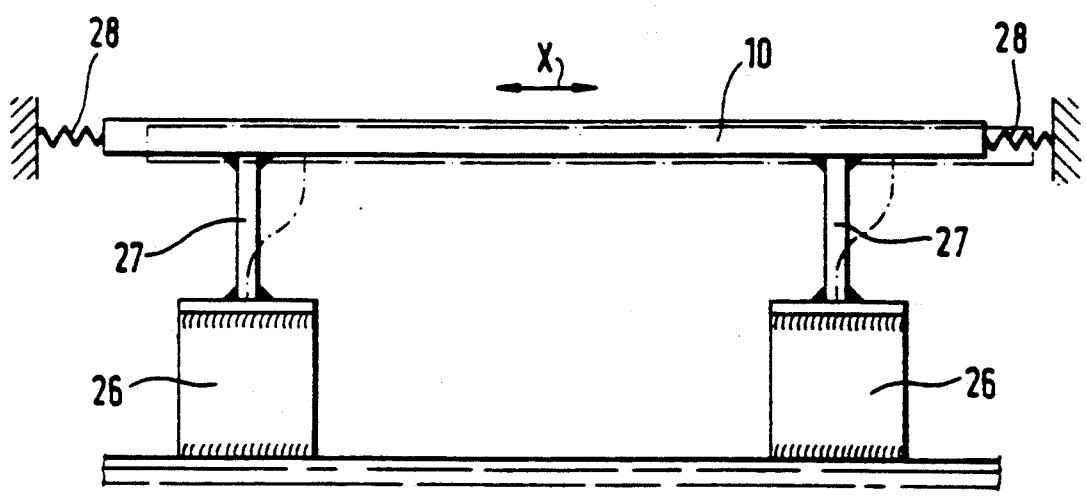
FIG. 4 shows a schematic view of a bearing element with resilient leaf springs.

The device illustrated in FIG. 1 has two drills 1, 2, which are equipped with drill bits 3. The drill bit 3 is shown on an enlarged scale in FIG. 1a and has a shank 3' and a drill head 4 at the free end of the shank 3. The truncated cone-shaped drill head 4 of the drill bit 3 has diamond chips c on its outer surface, whereby a conical abrading face is formed. On the end face 5 of the drill head, there is also an abrasive coating of diamond chips c, so that both a vertical bore and an undercut at the bottom of the bore can be produced by the drill bit 3.

The drill bits 3 project into straight drilled holes 6 of a facing panel 7. In this position the reaming-out operation for producing an undercut can begin. For this purpose, the facing panel 7 is rotated by a drive arrangement 8.

The facing panel 7 is secured by suction devices 9 to a drilling table 10 which is movable in the X- and Y-directions and is mounted by bearing elements 11 on a transverse guide 12 extending in the X-direction.

The bearing element 11, the side view of which is shown in FIG. 3, have a short longitudinal guide 13 on which a bearing bush 14 joined to the drilling table 10, is guided. The longitudinal guide 13 insures mobility of the drilling table 10 in the Y-direction.

The drive arrangement 8 has a drive shaft 15 rotatable by a drive machine (not shown). On the drive shaft 15, there is mounted a base member 16 on which a lever 17 is pivotally mounted on a bearing journal 18. At the top of the pivotal lever 17, there is provided a trunnion 19 which engages a bearing 20 secured to the drilling table 10. There is provided a drive including a pneumatic cylinder 21 and a piston rod 22 acting on the pivotal lever 17. The piston rod 22 is visible in FIG. 2. The compressed air to the pneumatic cylinder 21 is supplied via a compressed air duct 23 extending coaxially in the drive shaft 15.

In FIG. 2, end stops 24, 25 are arranged on both sides of the pivotal lever 17. The stops guarantee a definite, fixed initial position and a definite, fixed end position for the pivotal lever and, therefore, also for the trunnion 19. In the position illustrated in FIG. 2, the trunnion 19 is in the initial or first position in which it is concentric with the drive shaft 15, so that in this position a rotation of the base member 16 does not effect a swivel movement at the drilling table 10. If, on the other hand, the pivotal lever is pivoted from the first position P1 into a second position P2, then the trunnion 19 has thereby an eccentricity e. On rotation of the base member, the trunnion 19 moves along a circular path whereby the drilling table 10 also executes a corresponding circular movement. The result of this circular movement is that the facing panel 7 is likewise swivelled, with the drill bits 3 reaming out an undercut in the drilled holes 6. When the reaming-out operation is finished then the pivotal lever 17 is brought into position P1 again. The drill bits 3 can be withdrawn from the drilled holes 6 again in this position, and the finished facing panel can then be removed. For this purpose, the vacuum in the suction arrangements 9 is cut off.

Figure 5:
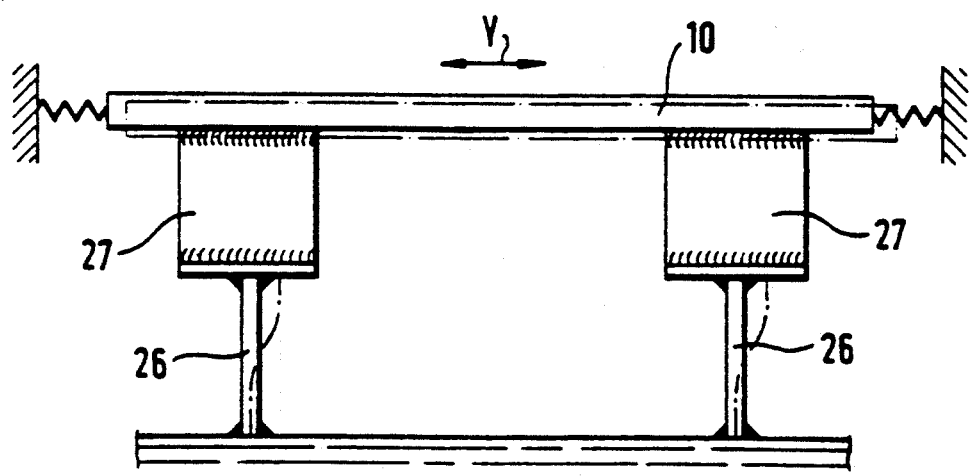
FIG. 5 shows a side view of the arrangement shown in FIG. 4.

Instead of the bearing elements 11 and the accompanying guides 12, 13, the drilling table may be mounted on resilient leaf springs, as shown in FIG. 4 and FIG. 5. For this purpose, leaf springs 26, 27 are arranged one above the other and displaced by 90°, providing mobility in the X-direction and in the Y-direction.

The drilling table 10 can be held by lateral spring and anti-vibration elements 28 in the unloaded state in a defined starting position. The anti-vibration elements are able to counteract vibrations occurring during the drilling and reaming-out operations.

Figure 6:
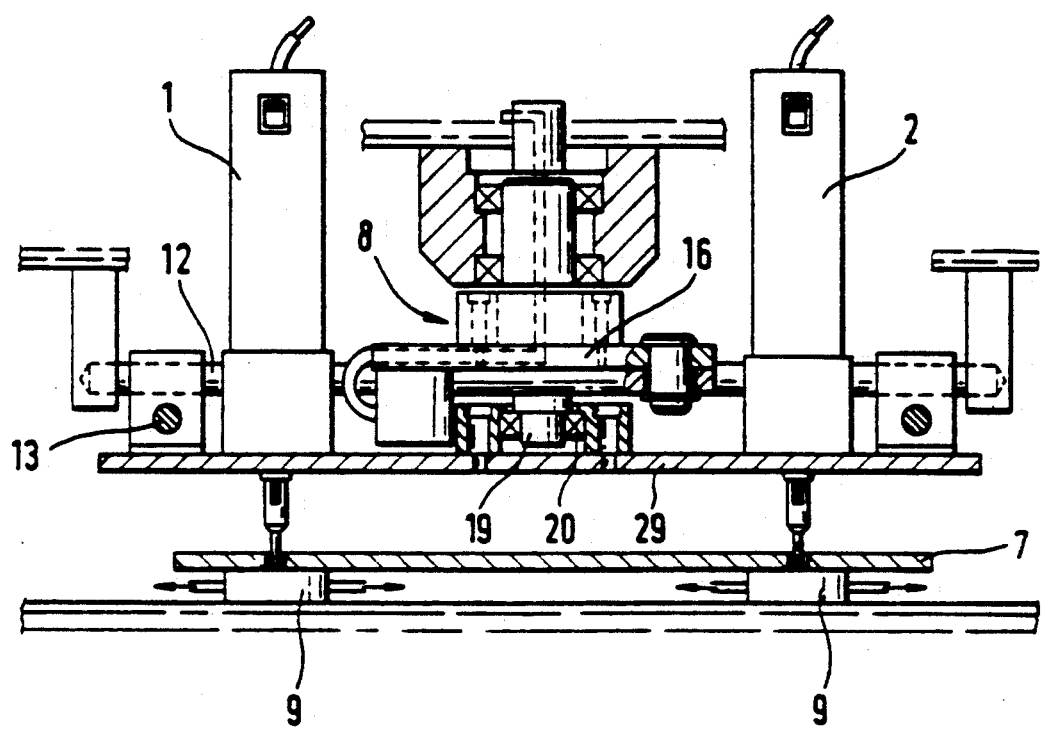
FIG. 6 shows a cross-sectional elevational view of the device according to the invention with pivotally mounted drills.

FIG. 6 illustrates a device for producing drilled holes with an undercut in which the facing panel 7 to be machined, is secured by suction devices 9 on a fixed base. The drills 1, 2, on the other hand, are arranged on a common holding plate 29 which is displaceable by transverse guides 12 and longitudinal guides 13 in the horizontal plane. Here too, a drive arrangement 8 as in FIG. 1 is provided, with which the holding plate 29 and the drills 1, 2 secured to it, can be pivoted to perform the reaming-out operation.

While the invention has been illustrated and described as embodied in a device for producing drilled holes with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

What is claimed is:

1. A device for producing a drilled hole with an undercut in a facing panel, said device comprising
   a drill bit having a shank and a drill head at a free end of the shank, said drill head being shaped for making the drilled hole and the undercut;
   a drilling table for supporting the facing panel in which the drilled hole is to be made, means for supporting the drilling table for displacement in a plane of the drilling table and for gyratory movement;
   a bearing attached to the drilling table;
   a rotatable base member having a rotation axis about which the base member is rotatable and a drive shaft attached to the base member for rotation of the base member;
   a trunnion projecting from the base member, having a trunnion axis and being engaged in the bearing attached to the drilling table, said trunning being movable from a first position in which the trunnion axis and the rotation axis of the base member coincide to a second position in which the trunnion axis is eccentric to the rotation axis of the base member;

means for moving the trunnion from the first position to the second position, said means for moving including a lever pivotally mounted on the base member, the trunnion being rigidly attached to the lever, and drive means secured to the base member for pivoting the lever so that the trunnion moves from the first position to the second position and from the second position to the first position, said drive means including a cylinder-piston assembly and a duct connected to the cylinder-piston assembly and extending coaxially in the drive shaft of the base member for supplying a drive fluid to the cylinder-piston assembly; and end stop means for limiting pivoting of the lever to precisely define the first position and the second position of the trunnion.

2. A device as defined in claim 1, further comprising suction means for securing the facing panel on the drilling table.

3. A device as defined in claim 1, further comprising anti-vibration means engaging the drilling table and acting in the plane of the drilling table.

4. A device as defined in claim 1, further comprising spring means for biasing the drilling table, said spring means acting in the plane of the drilling table.

5. A device as defined in claim 1, wherein said means for supporting the drilling table include transverse and longitudinal guides for mounting the drilling table thereon.

6. A device as defined in claim 1, wherein said means for supporting the drilling table include two resilient elements each consisting of two leaf springs displaced by 90° relative to each other, said leaf springs being resiliently deformable in an X- and Y-direction.

7. A device for producing a drilled hole with an undercut in a facing panel, said device comprising a drill bit having a shank and a drill head at a free end of the shank, said drill head being shaped for making the drilled hole and the undercut;

a drilling table mounted on transverse and longitudinal guides for supporting the facing panel in which the drilled hole is to be made, the drilling table being displaceable in a plane of the drilling table;

a bearing attached to the drilling table;

a rotatable base member having a rotation axis about which the base member is rotatable and a drive shaft attached to the base member for rotation of the base member;

a trunnion projecting from the base member, having a trunnion axis and being engaged in the bearing attached to the drilling table, said trunning being movable from a first position in which the trunnion axis and the rotation axis of the base member coincide to a second position in which the trunnion axis is eccentric to the rotation axis of the base member;

means for moving the trunnion from the first position to the second position, said means for moving including a lever pivotally mounted on the base member, the trunnion being rigidly attached to the lever, and drive means secured to the base member for pivoting the lever so that the trunnion moves from the first position to the second position and from the second position to the first position, said drive means including a cylinder-piston assembly and a duct connected to the cylinder-piston assembly and extending coaxially in the drive shaft of the base member for supplying a drive fluid to the cylinder-piston assembly;

end stop means for limiting pivoting of the lever to precisely define the first position and the second position of the trunnion; and spring means for biasing the drilling table, said spring means acting in the plane of the drilling table.

* * * * *